United States Patent [19]
Sund et al.

[11] 3,896,921
[45] July 29, 1975

[54] CONVEYOR SYSTEM FOR TRANSPORTING WORKPIECES THROUGH A PROCESSING CYCLE

[75] Inventors: William Sund, Luc; George Khouzam, Candiac, both of Canada; Hani Tawil, River Vale, N.J.

[73] Assignee: Electrovert Manufacturing Co. Ltd., Mount Vernon, N.Y.

[22] Filed: Oct. 11, 1973

[21] Appl. No.: 405,285

[52] U.S. Cl. ............. 198/19; 29/200 A; 104/172 S
[51] Int. Cl.² ................................ B65G 25/00
[58] Field of Search ............. 198/19; 104/172 S; 29 200 A/

[56] References Cited
UNITED STATES PATENTS

| | | | |
|---|---|---|---|
| 2,751,851 | 6/1956 | Curtis et al. | 198/19 |
| 2,751,852 | 6/1956 | Joy | 104/172 S |
| R25,886 | 10/1965 | Cargill | 29/200 A |

Primary Examiner—Evon C. Blunk
Assistant Examiner—Jeffrey V. Nase
Attorney, Agent, or Firm—McGlew and Tuttle

[57] ABSTRACT

An extruded metal guide rail extends from a workpiece receiving station past one or more workpiece processing stations to a workpiece discharging station, and is preferably arranged in an endless configuration. A driven roller chain extends, in laterally confined relation, along and guided in the guide rail. A plurality of runners are engaged with the guide rail for guided movement therealong, and each runner has mounted thereon, for relative vertical displacement between a workpiece transport position and a workpiece processing position, a respective work support which is biased to its workpiece transport position. At each processing station, cam means progressively move each workpiece support, relative to its runner, downwardly into its processing position and then release the workpiece support for relatively abrupt vertical return into its transport position. Following each processing station, the guide rail is formed with respective runner idling portions and, as each runner reaches an idling portion, it is uncoupled from the roller chain to remain stationary. Each runner is moved along the idling portion by succeeding runners moved into the idling portion by the roller chain and, at the end of each guide rail idler portion, each runner is again coupled with the chain. In one embodiment of the invention, each runner rotatably supports a sprocket engaged with the roller chain and carries a cam operated latch which normally holds the sprocket against rotation. As the runner reaches an idler portion, the latch is released for free rotation of the associated sprocket. In another embodiment of the invention, each runner has a laterally reciprocable latch for coupling it to the roller chain, and cam means at each idler portion retract the latch as the runner enters the idler portion, with the latch being again engaged with the roller chain when the runner has been pushed to the end of the respective idler portion. The purpose of the arrangement is to provide gradual immersing of the workpieces into a processing fluid, such as molten flux or molten solder, followed by abrupt vertical withdrawal from the processing fluid.

6 Claims, 8 Drawing Figures

PATENTED JUL29 1975    SHEET    1    3,896,921

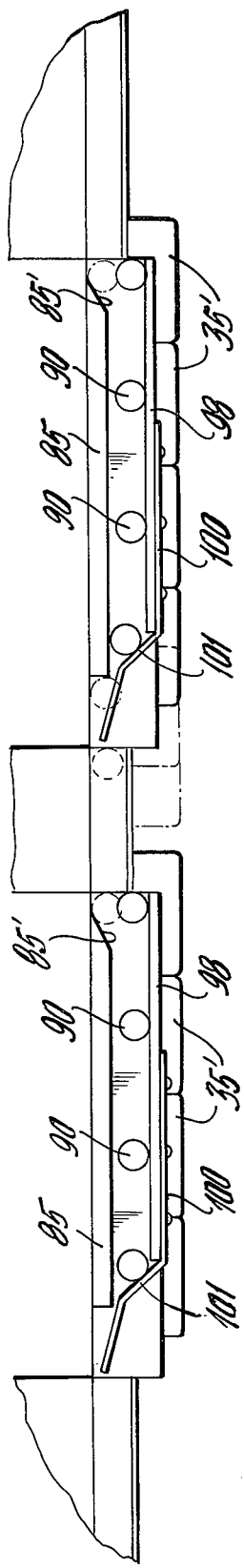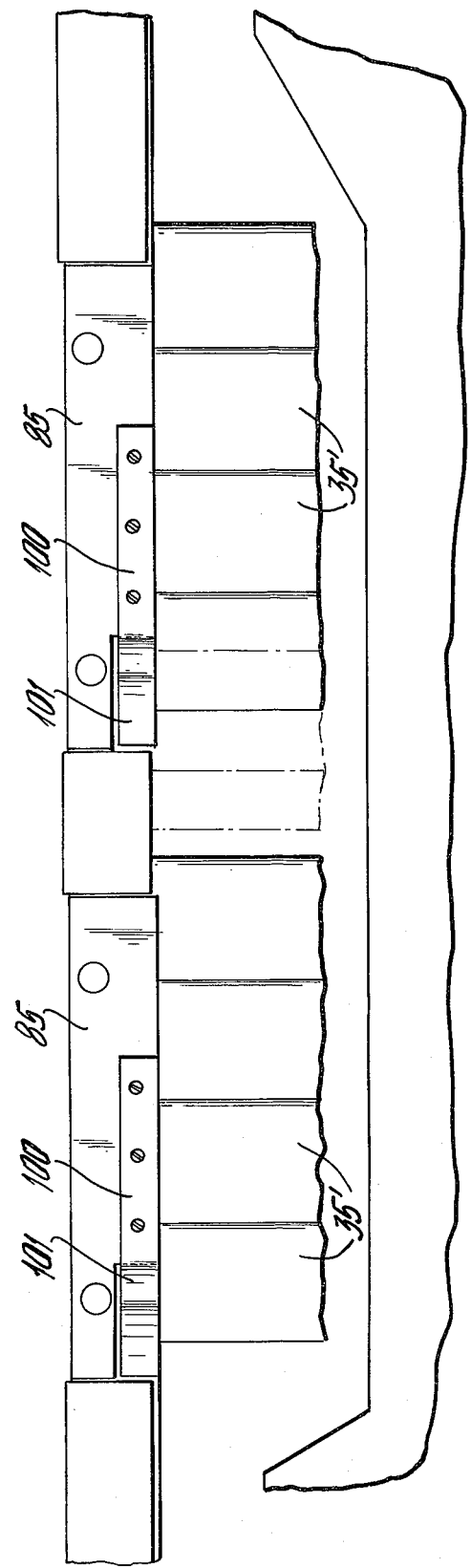

CONVEYOR SYSTEM FOR TRANSPORTING WORKPIECES THROUGH A PROCESSING CYCLE

FIELD AND BACKGROUND OF THE INVENTION

This invention relates to a conveyor system for receiving, transporting and discharging workpieces to be processed at processing stations and, more particularly, to a novel, improved and simplified conveyor system whereby workpieces, to be dipped into a processing fluid at a processing station, are progressively moved downwardly into the fluid and abruptly retracted vertically out of the fluid, followed by idling of the workpieces at each station for a period of time after which the workpieces are transported to another station or to a discharge device.

In many mass production or assembly line operations, it is desirable to automatically feed workpieces to a conveyor for transport by the conveyor past a series of workpiece processing stations, followed by removal of the workpieces from the conveyor. In some situations, the processing of the workpieces requires dipping of the workpiece into a processing fluid and withdrawal of the workpiece from the processing fluid, followed by other operations. This is particularly true of assembly line processing of various electrical and electronic items in which electrically conductive parts or connections must be fluxed, soldered, cleaned, rinsed and dried.

A disadvantage of known conveyor systems for processing electrical and electronic components through a fluxing and soldering cycle, in which the workpieces are progressively fluxed, soldered and then further treated, is that known conveyor systems will move the workpieces progressively downwardly to dip the workpieces into the treating fluid, such as a flux or a standing wave of molten solder, and then withdraw the workpieces progressively or gradually from the treating fluid. Particularly in the case of solder dipping in a standing wave of molten solder, such gradual or progressive withdrawal of the workpieces from the solder results in the formation of icicles and the like on the trailing ends of the workpieces due to the progressive and gradual withdrawal of the workpieces from the bath of flux or the standing wave of molten solder, or the like.

SUMMARY OF THE INVENTION

In accordance with the invention, a conveyor system for transporting workpieces to processing stations, where the workpieces are dipped into a processing fluid such as molten or liquid flux or molten solder is provided and is effective to progressively move the workpieces downwardly to dip them into the liquid flux or molten solder wave and then to abruptly withdraw the workpieces upwardly out of the standing wave of liquid flux or the standing wave of molten solder. Furthermore, following such withdrawal, the workpieces are automatically idled for a preselectable interval above the particlar bath into which they have been dipped before the workpieces are moved on to a following processing station. The abrupt vertically upward withdrawal of the workpieces from the flux or solder eliminates the disadvantages of known conveyor systems with respect to after-dripping and the like, particularly at the trailing ends of the workpieces.

More specifically, the invention conveyor system includes a novel guide rail which is extruded from a metal, such as aluminum, to any length desired, and which may be formed into any desired configuration in plan, an elongated oval configuration being desirable to provide an endless conveyor system. A driven roller chain extends in a channel formed along the guide rail in laterally confined relation, for guiding in the guide rail, and is driven by suitable means, such as an electric motor. The guide rail is also formed with a guiding groove for receiving portions of work support-carrying runners associated with means for selectively coupling each runner to the chain and for uncoupling the runner from the chain at an idling portion of the guide rail. The coupling and uncoupling means are respective to each runner, and are cam operated at preselected locations along the guide rail to uncouple the runner from the roller chain and, at other preselected positions along the guide rail, to re-couple the runner to the roller chain. Each runner, uncoupled from the roller chain at an idling portion of the guide rail, is moved along the idling portion by other runners which are moved into the idling portion by the roller chain and, as each runner reaches the trailing end of an idling portion, it is automatically re-coupled with the chain for further transport along the guide rail.

Each work support, carried by a respective runner, is mounted for vertical displacement relative to the runner between a workpiece transport position and a workpiece processing position, and spring means bias each workpiece support to its transport position. As a runner reaches a processing station, cam means progressively move the associated workpiece support downwardly to dip a workpiece into a processing fluid, such as a standing wave of liquid flux or a standing wave of molten solder, and immediately thereafter, the cam means releases the workpiece for abrupt vertically upward movement to its workpiece transport position to withdraw the workpiece vertically from the liquid flux or molten solder. Thereafter, the runner and the work support carrying the workpiece are idled for a selected period of time at the respective workpiece processing station. As other runners are moved into the idler portion of the guide rail, at each processing station, the preceding runners are progressively advanced along the idler portion and, at the end thereof, are re-coupled with the roller chain.

In one embodiment of the invention, each runner rotatably supports a sprocket or star wheel engaged with the roller chain, and also has a releasable latch which restrains this wheel from rotating so that the roller chain will move the runner along the guide rail. At the entrance to each idler portion, a cam is formed by cutting away a a portion of the guide rail to a preselected depth so that the latch means automatically pivots to a position releasing the associated sprocket or star wheel for rotation by the roller chain without any movement of the associated runner. At the end of the cut away portion of the latch guiding portion of the guide rail, the latch is pivoted back to a position locking the associated sprocket or star wheel against rotation for further transport of the runner along the guide rail.

In another embodiment of the invention, each runner has a laterally reciprocable latch with a fork end engageable with the roller chain. As each runner reaches an idler portion of the guide rail, cam means retract the forked latch from the roller chain and, at the exit end of the idler portion of the guide rail the cam means reengage the forked latch with the roller chain.

An object of the invention is to provide an improved conveyor system for receiving, transporting and discharging workpieces to be processed at processing stations.

Another object of the invention is to provide such a conveyor system which will progressively dip workpieces into processing fluid at processing stations and abruptly and vertically retract the workpieces from the processing fluid.

A further object of the invention is to provide such a conveyor system in which, following retraction of a workpiece from a processing fluid, the workpiece is idled for a preselected period of time before being moved to the next processing station.

Yet another object of the invention is to provide such a conveyor system including a novel extruded metal guide rail along which runners, each carrying a respective workpiece support, are guided and moved by a roller chain extending in laterally confined relation in a channel in the guide rail.

For an understanding of the principles of the invention, reference is made to the following description of typical embodiments thereof as illustrated in the accompanying drawings.

BRIEF DESCRIPTION OF THE DRAWINGS

In the drawings:

FIG. 7 is a somewhat schematic plan view illustrating the cam means for operating the latch of FIG. 6; and FIG. 8 is a somewhat schematic front elevation view corresponding to FIG. 7.

DESCRIPTION OF THE PREFERRED EMBODIMENTS

Figure 1:
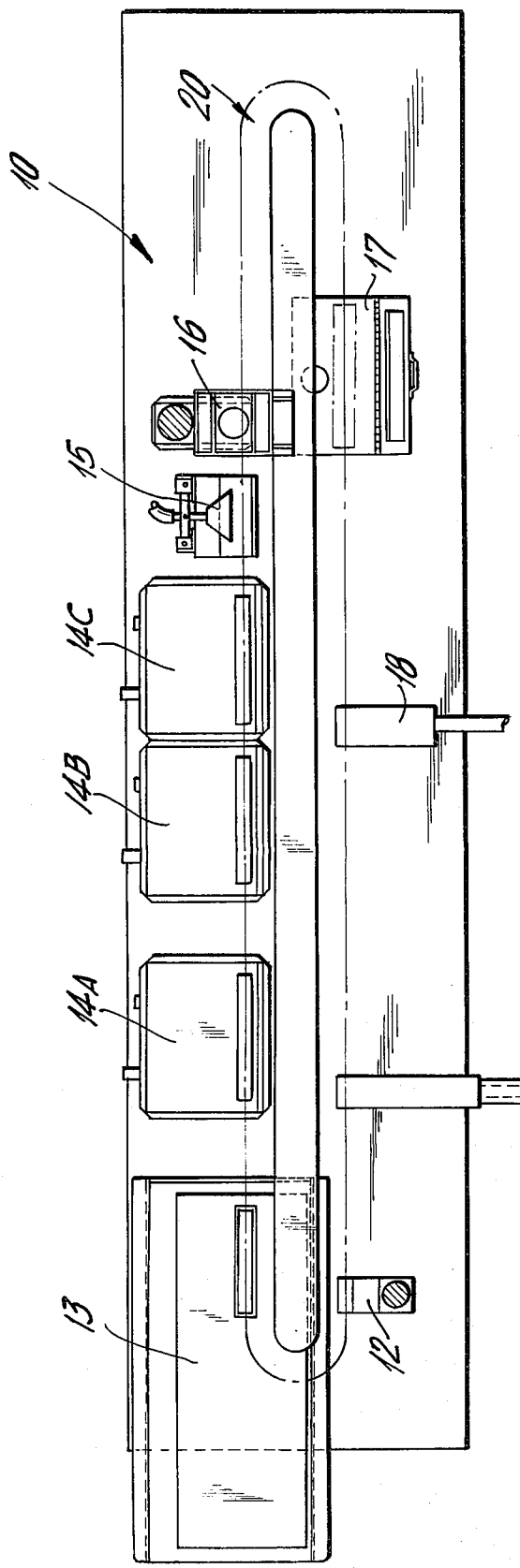
FIG. 1 is a plan view of a worktable having the invention conveyor system mounted thereon and including several processing stations for fluxing, soldering or tinning, cleaning and drying electrical and electronic components transported by the conveyor system.

Referring to FIG. 1, a conveyor system embodying the invention generally indicated at 20, is illustrated as mounted above a worktable 10 for processing workpieces in the form of electrical or electronic components. Conveyor system 20 receives the workpieces at a loading fixture 11 and transports the workpieces to a fluxer 12 where the workpieces are dipped into a liquid flux. After being dipped into the liquid flux and abruptly vertically retracted upwardly from the liquid flux, the workpieces are transported by conveyor system 20 to a soldering station 13 which may be constituted by a known type of wave fluxer producing a standing wave of molten solder. At soldering station 13, the workpieces are dipped into the standing wave of molten solder and withdrawn vertically upwardly therefrom, after which the workpieces remain at the soldering station for a preselected time. The workpieces are then transported past rinsing stations 14A, 14B and 14C. At rinsing station 14A, the workpieces are dipped into a reservoir of tap water and are withdrawn vertically from the reservoir, following which the workpieces are idled for a preselected time. At rinsing stations 14B and 14C, the workpieces are successively dipped into a reservoir of de-ionized water and withdrawn vertically upwardly therefrom, followed by idling of the workpieces. At work station 15, the workpieces are subjected to an air blast from an air knife, after which they are dipped into alcohol at work station 16 for an alcohol rinse, after which they are withdrawn vertically from the alcohol rinse and then transported past a heating station 17 at which there is a heater lamp for drying the workpieces. The workpieces are thereafter discharged at an unloading fixture 18.

In accordance with the invention, at each station where there is a processing liquid, the workpieces are progressively moved downwardly into the processing liquid, abruptly withdrawn vertically therefrom and then idled at the station for a preselected time. This is accomplished by suitable cam means in operative association with each runner forming part of conveyor system 20 and with its associated workpiece support. The conveyor system 20, including a guide rail, runners guided along the guide rail, a roller chain for driving the runners along the guide rail, and the workpiece holders associated with the runners will now be described more fully with reference, at first, to FIGS. 2, 3 and 4 which illustrate one embodiment of the runner, in association with the guide rail, and one embodiment of a workpiece support.

Guide rail 25 is an extrusion of aluminum or the like, and may be extruded in any desired length in accordance with installation requirements. Guide rail 25 includes a mounting portion 21 by means of which the guide rail may be secured to suitable supports, such as supports mounted on table 10 of FIG. 1. Mounting portion 21 has a forward extension 22 extending outwardly therefrom and formed with an upwardly opening channel or slot 23, having inwardly extending and facing ribs 24 intermediate its height, for receiving and laterally confining a driven roller chain 30. Roller chain 30 may have a construction similar to that of the usual bicycle roller chain. Above extension 22, the outer face of mounting portion 21 is formed with an elongated outwardly opening horizontal slot or groove 26, for a purpose to be described. A depending leg 27 extends downwardly from extension 22, and its outer face, intermediate its height, is formed with a cam rib 28, also for a purpose to be described.

In association with guide rail 25, there is a guide rail cover 31 which might likewise be an aluminum extrusion of any desired length in accordance with installation requirements. Rail cover 31 has its under surface formed with a generally channel-shaped recess 32 by means of which the rail cover 31 may be fitted over the upper surface of rail 25 and bolted or otherwise secured to the rail 25. At its front or outer end, rail cover 31 is formed with a depending lip 33 for a purpose to be described.

The roller axles or pivot pins 34 of roller chain 30 are projected upwardly a substantial extent to engage latching means on runners, generally indicated at 35, guided in guide rail 25 and rail cover 31. Each runner 35 is an aluminum alloy casting which is generally of inverted L-shape including a horizontal leg 36 extending inwardly beneath the depending lip 33 of rail cover 31. Leg 36 has a longitudinal rib 37 extending upwardly from its upper surface into the recess defined by mounting portion 21 of guide rail 25 and lip 33 of rail cover 31. A reduced thickness lip 38 on the inner end of leg 36 extends into the lateral groove 26 in the forward face of the mounting portion 21 of guide rail 25. In cooperation with lip 33 of rail cover 31, rib 37 defines a substantially rectangular cross section recess receiving a slide 42 of a suitable self-lubricating plastic, such as "TEFLON," which is a polytetrafluoroethylene, which is held in place by a headed pin 41 serving as a pivot for rotation of a star wheel 40 mounted on the underside of leg 36 and meshing with the pivot pins 34 of roller chain 30. Pin 41 is so located that the periphery of star wheel 40 projects outwardly of the outer surface of lip 33, for a purpose to be described. The outwardly projecting peripheral portion of star wheel or sprocket 40 extends into a laterally inwardly opening notch 43 formed in the upper end of a vertical leg 44 of runner 35, at the junction of legs 36 and 44.

At the juncture of legs 36 and 44, runner 35 is formed with an upwardly and inwardly opening slot 45 in which a latch pin 50 is mounted for oscillation about a horizontal axis. Slot 45 has a bottom surface 46 which extends downwardly and inwardly from about the upper edge of leg 44 to a point substantially horizontally aligned with the lower edge of depending leg 27 of guide rail 25. Intermediate its ends, sloping wall 46 is interrupted to provide a vertical wall 47 and a horizontal wall 48 defining a notch. Latch pin 50 is swingably mounted on a roll pin 51 extending transversely of notch 45 somewhat below the upper edge of vertical wall 47, and substantially below the midpoint of the length of pin 50, so that the length of pin 50 above roll pin 51 is very much greater than the length of pin 50 below the roll pin 51. Latch pin 50 has a relatively short top portion 52 which is located somewhat above star wheel or sprocket 40 and which normally engages the outer surface of depending front lip 33 of rail cover 31. Top portion 52 is joined by a reduced neck 53, somewhat longer than the axial thickness of star wheel or sprocket 40, to an elongated bottom portion 54 which, for a purpose to be described, is formed with a beveled end 56 spaced, in the vertical orientation of pin 50, slightly above horizontal wall 48 of notch 45. Adjacent beveled end 56, the bottom portion 54 of pin 50 is arranged to ride along cam rib 28 on depending leg 27 of guide rail 25. This cam rail normally maintains pin 50 in the vertically oriented position illustrated in FIG. 2.

Coplanar with the lower edge of notch 43, vertical leg 44 of runner 35 is formed with an inward extension or flange 57 which defines the upper edge of a second notch 58 in leg 44. A lower slide 55 of suitable self-lubricating plastic, such as the mentioned "TEFLON," has a horizontal leg 61 extending into notch 58, and is anchored to flange or rib 57 by a pair of roll pins 62 inserted through leg 61 and through flange 57. Lower slide 55 bears against the outer vertical surface of the extension 22 of guide rail 25, and against the upper surface of cam rib 28. By the arrangement of parts on the configurations so far described, runner 35 is guided for sliding movement along extruded guide rail 25 and extruded rail cover 31, the neck portion 53 of pin 50 engaging star wheel or sprocket 40 to prevent rotation of the latter about pin 41 so that chain 30 moves each runner 35 along the guide rail and its cover.

Figure 2:
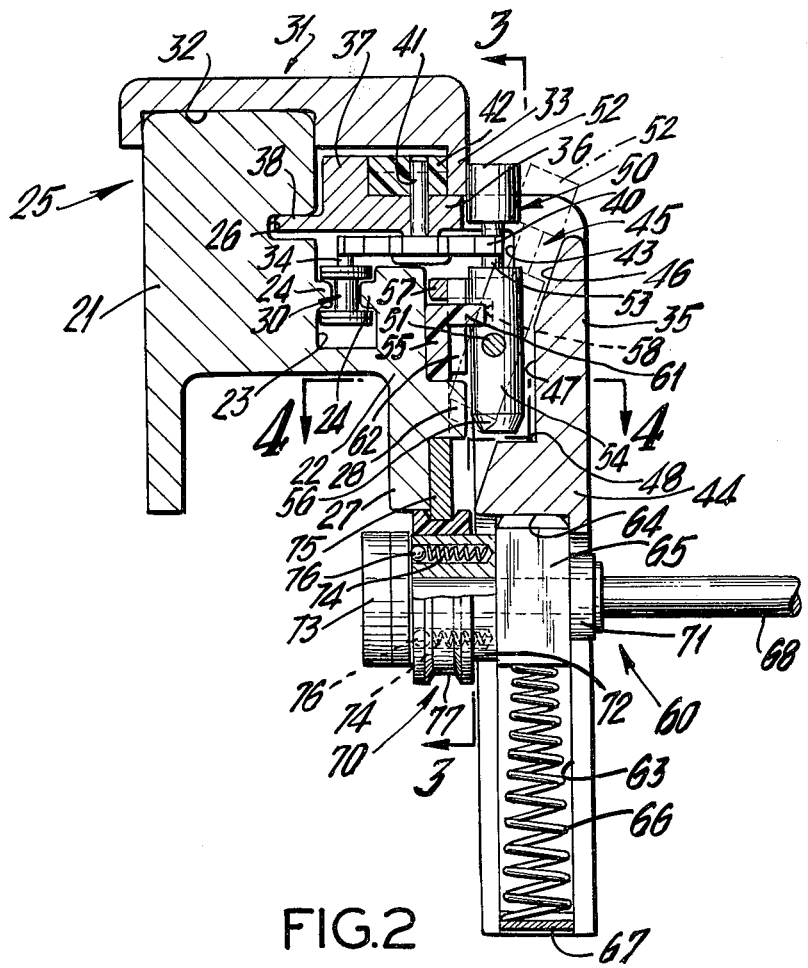
FIG. 2 is a transverse vertical sectional view through the guide rail of the conveyor system and illustrating a runner mounted in the guide rail together with its associated work support.

As stated, each runner 35 has associated therewith a vertically displaceable work support and, for this purpose, that portion of leg 44 below the lower edge of depending leg 27 of guide rail 25 is forked to provide two downwardly elongated and longitudinally spaced legs each formed, on its inner surface, with a semi-cylindrical recess 63, the recesses 63 serving as guides for the vertical movement of a workpiece support generally indicated at 60. The workpiece support 60 is movable between an upper workpiece-transport position and a lower workpiece-processing position, the upper position being illustrated in FIG. 2. For this purpose, each work support 60 includes a cylindrical slide 65 engaged in the recesses 63, slide 65 being made of a suitable self-lubricating plastic, such as "TEFLON." A spring 66 which, in the embodiment of FIG. 2, is a coil compression spring, is seated on a retainer plate 67 at the bottom end of the forked legs of runner 35, and biases slide 65 upwardly into engagement with a horizontal surface 64 of leg 44. A shaft 68 is rotatably supported in a diametric bore in slide 65, and projects outwardly of runner 35 to receive a suitable fixture for supporting a workpiece. Inasmuch as various such fixtures may be used in accordance with the type of workpiece to be processed, only a part of the outwardly projecting portion of shaft 68 has been shown.

Shaft 68 extends through an outer hub 71 and an inner hub 72, each of which hubs is guided in a respective slot formed by the spaced forked portions of leg 44 of runner 35. Inner hub 72 rotatably supports a guide wheel 70 of suitable plastic composition material and cooperable, at each workpiece processing station where a workpiece is to be dipped into a processing fluid, with a cam 75 secured to the inner surface of depending leg 27 of extension 22 of guide rail 25. The mounting and function of these cams will be described more fully hereinafter. The inner end of shaft 68 is secured to a detent wheel 73, which serves as a retainer for guide wheel 70. Inner hub 72 is formed with bores each receiving a spring 74 and a ball detent 76, the ball detents being cooperable with recesses in the inner surface of detent wheel 73. Thereby, detent wheel 73 may be used to adjust the angular position of shaft 68 and any fixture secured thereto, as necessary or desirable, with the spring pressed ball detent 74, 76 serving to releasably retain the shaft 68 in its angularly adjusted position.

The cams 75, which serve to lower each work support 60 at a processing station where a workpiece is to be dipped into a processing fluid, may be strips of 1/4 inch thick aluminum having a generally trapezoidal shape, and provided with slotted openings by means of which they can be secured in longitudinally adjusted position to leg 27 of guide rail 25 at the entrance to each work section. Normally, the guide wheel 70, which has a grooved periphery 77, rides along the lower edge of depending leg 27. As each runner 35 and its associated work support 60 enter a processing station at which a workpiece is to be dipped into a processing fluid, the grooved periphery 77 of guide wheel 70 engages the lower downwardly and forwardly sloping surface 78 of a cam 75, so that the workpiece support is moved downwardly, against the bias of spring 66, to its workpiece processing position in which it dips the workpiece into the processing fluid. When guide wheel 70 reaches the longer vertical edge of a cam 75, it runs off sloping surface 78 and spring 66 abruptly moves the workpiece support 60 to its upper workpiece transporting position, so that the workpiece is extracted vertically from the processing fluid.

As each workpiece is extracted from the processing fluid, its supporting runner 35 is disengaged from roller chain 30 so as to be idled along a preselected length of guide rail 25. In order to effect disconnection of a runner 35 from roller chain 30, pins 50 must be swung out, clockwise as viewed in FIG. 2, to disengage pin portions 53 from the associated star wheel or sprocket 40, so that the star wheel or sprocket 40 can "idle" in engagement with the moving roller chain 30. Such swinging out of the pins 50 is effected by the cam rib 28, as best seen in FIG. 4.

Figure 3:
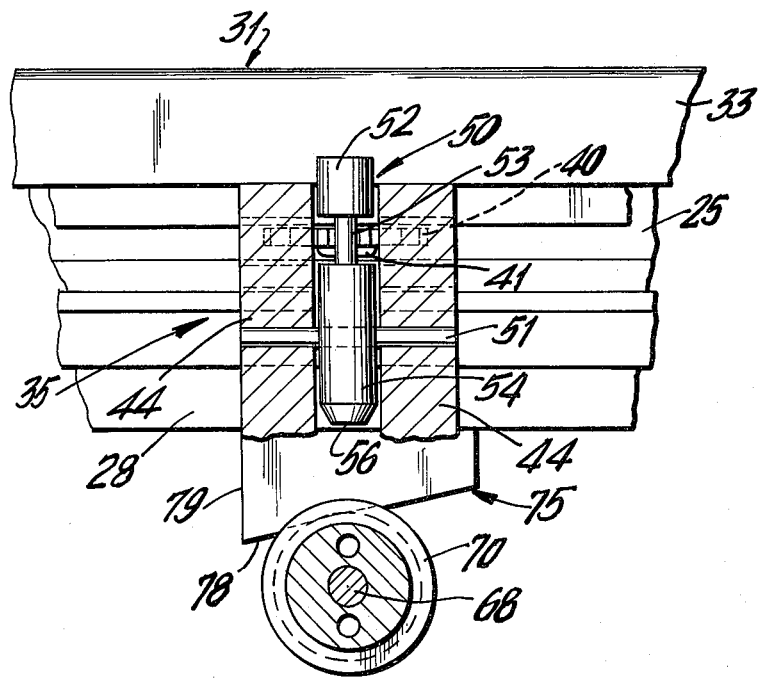
FIG. 3 is a view taken on the line 3—3 of FIG. 2.
Figure 4:
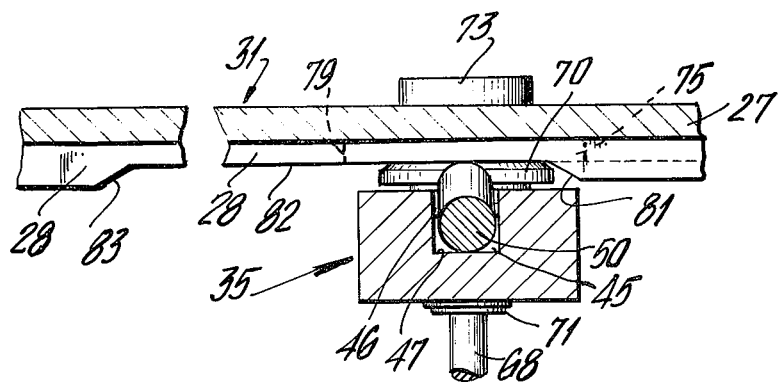
FIG. 4 is a horizontal sectional view taken on the line 4—4 of FIG. 2.

Referring to FIGS. 3 and 4, beginning at a point substantially aligned with the trailing vertical edge 79 of each cam 75, cam rib 28 is filed or ground away about 1/2 its depth and for a longitudinal distance determined by the desired length of the idling portion of guide rail 25. As illustrated in FIG. 4, the idle portion comprises an entrance beveled portion 81, a rectilinear portion 82, and an exit bevel portion 83.

As a pin 50 of a runner 35 reaches bevel portion 81, the lower portion 54 of the pin swings inwardly, or clockwise as viewed in FIG. 2, due to the fact that the pin 50 is "top heavy" by virtue of its roll pin 51 being very substantially lower than its center of gravity. The bevel surface 56 then engages the idle portion 82 of cam rib 28, with pin portion 53 disengaging star wheel or sprocket 40 so that the runner 35 is now idle. Such idling occurs immediately after the work support 60 has been abruptly moved vertically by spring 66, thus retracting the workpiece vertically upwardly from the processing fluid. As following runners 45 reach the particular station and move into the idle portion 82, they push preceding runners along this idle portion until eventually the beveled lower end 56 and the lower portion 54 of the pin 50 ride along the exit beveled portion 83 to swing the pin 50 clockwise to re-engage pin portion 53 with star wheel or sprocket 40, thus stopping idle rotation of the star wheel or sprocket. The runner is thus re-coupled to the roller chain 30 for transport to the next processing station.

Figure 5:
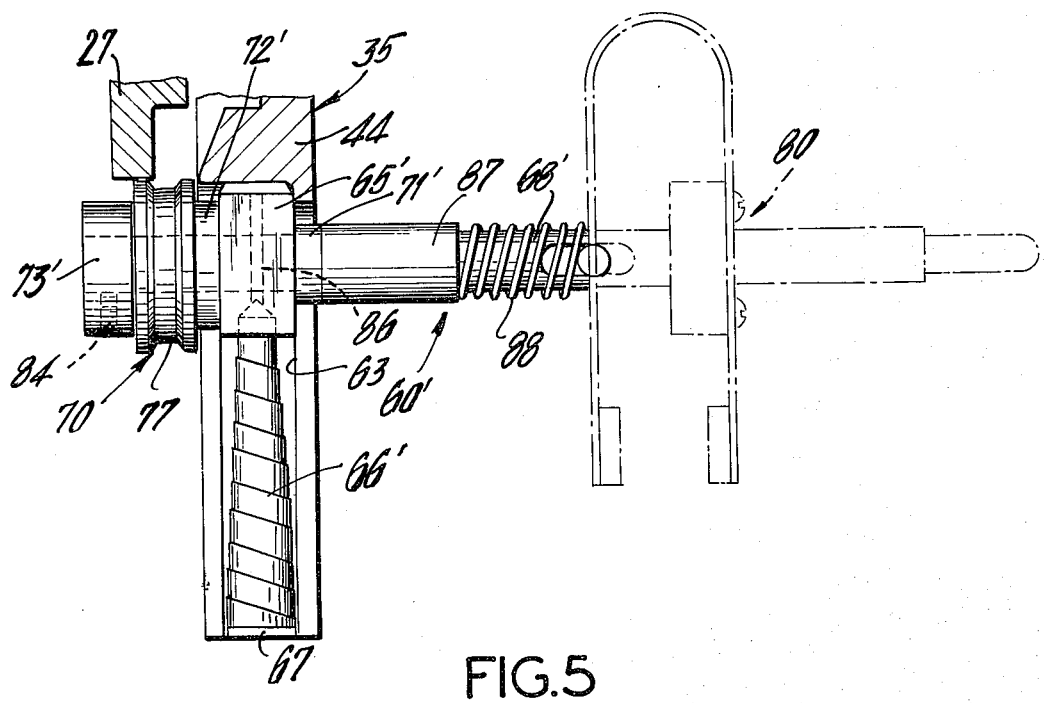
FIG. 5 is a partial view, corresponding to FIG. 2, and illustrating an alternative embodiment of a work support.

FIG. 5 illustrates an alternative embodiment of a work support 60', wherein the principal difference is the substitution of a telescoping, ribbon-type coil spring 66' for the spring 66 of FIG. 2. In addition, the wheel 73' is fixedly secured to shaft 68' by a set screw 84, and slide 65' has an axial bore extending therethrough which receives a roll pin 86 also extending diametrically through shaft 68'. Thus, the shaft 68' is non-rotatable with respect to slide 65'. A spacer sleeve 87 is fitted over shaft 68' to abut hub portion 71', and is engaged by a coil spring 88 whose opposite end abuts a workpiece supporting fixture generally indicated at 80 and forming no part of the present invention. Work support 60' is mounted in a runner 35 in the same manner as work support 60, and is vertically displaceable, against the bias of spring 66', from a workpiece supporting position to a workpiece processing position when guide wheel 70 engages a cam 75, the workpiece support 60' being moved abruptly vertically to its workpiece transporting position when guide wheel 70 reaches the end of the sloping surface 78 of a cam 75.

Figure 6:
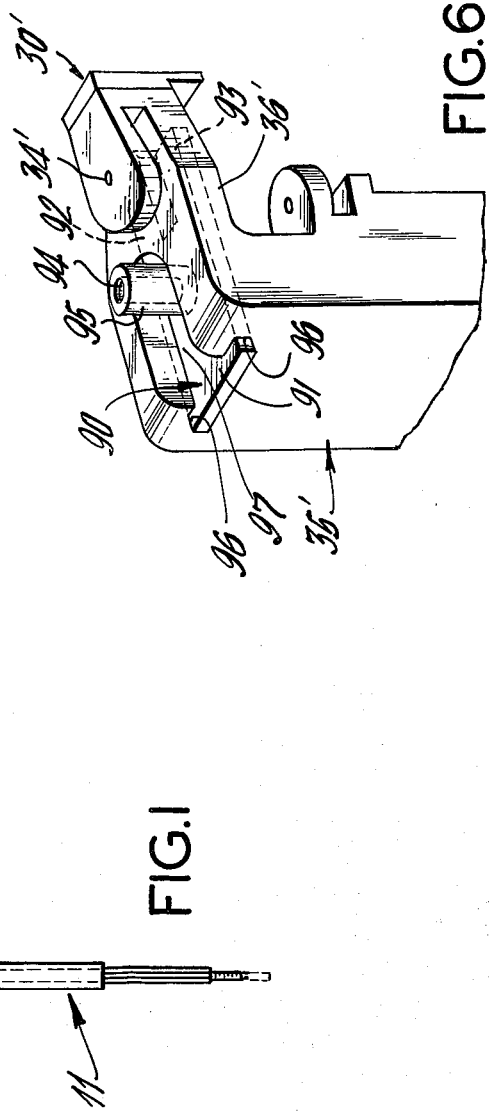
FIG. 6 is a partial perspective view illustrating another embodiment of a roller chain engaging latch.

FIG. 6 illustrates a modified runner 35 having a laterally reciprocable latch 90 cooperable in this conveyor chain 30' moving along guide rail 25. Latch 90 comprises a substantially flat plate 91 whose inner end is forked to provide a leading leg 92 and a trailing leg 93. Leg 92 has a beveled or chisel form inner end, and is somewhat longer than the substantially rectangular leg 93. Legs 92 and 93 define a fork arranged to embrace a pin 34' of conveyor chain 30'. Intermediate the ends of plate 91, a pin 94 is threaded thereinto to extend upwardly therefrom, and rotatably supports a bronze bushing 95.

The horizontal leg 36' of runner 35' is configured to provide guide slots 96 for plate 91, as well as a slot or notch 97 for bushing 95. With this configuration, latch 90 is mounted for lateral reciprocation relative to the horizontal leg 36' of runner 35' to engage and disengage pins 34' of conveyor chain 30'.

In this embodiment of the invention, the latch 90 is reciprocated laterally of runner 35' by suitable cams at each idling station. Referring to FIGS. 7 and 8, at each idling portion of guide rail 25, a cam 85 is suitably bolted or screwed to guide rail 25 or to rail cover 31, and has a beveled entrance end 85'. As each runner 35' reaches the idling portion, its roller 90 is moved outwardly by beveled end 85' of cam 85 to retract latch 90 from engagement with conveyor chain 30'. The rollers 90 then move in a channel defined by cam 85 and a retainer lip 98. A second cam 100 has a rectilinear portion bolted or screwed to lip 98 and has a bent resilient portion 101, at the trailing end of each idling portion projecting into the path of movement of the bushings 90. Thus, as each runner 35' reaches the end of an idler portion, its associated bushing 90 is moved inwardly by resilient end 101 of cam 100 to re-engage the associated latch 90 with the conveyor chain 30'. Other than this, the arrangement of FIGS. 6, 7 and 8 operates in the same manner as described above for runner 35.

From the foregoing description of the invention, it will be clear that the conveyor system provides an arrangement where in workpieces, arriving at a processing station in which they are to be dipped into a processing fluid, are progressively deflected downwardly into the processing fluid and then abruptly retracted vertically upwardly from the processing fluid. Following the vertical upward retraction of each workpiece, the runner supporting the same is idled for a predetermined length of time at the respective processing station, after which the runner is re-engaged with an endless chain drive conveyor for movement of the workpiece to another processing station.

While specific embodiments of the invention have been shown and described in detail to illustrate the applications of the principles of the invention, it will be understood that the invention may be embodied otherwise without departing from such principles.

What is claimed is:

1. A conveyor system, for receiving, transporting and discharging workpieces to be processed at processing stations, comprising, in combination, an elongated guide rail arranged to extend substantially horizontally past a series of workpiece processing stations; a driven chain extending in laterally confined relation along and guided in said guide rail; runners engaged with said guide rail for guided movement therealong past the processing stations; respective workpiece supports mounted on each runner; respective latch means on each runner operable to couple the associated runner to said chain and to uncouple the associated runner from said chain; said guide rail having idling portions extending therealong at certain of said processing stations; means operable, as each runner reaches an idling portion to disengage the associated latch means from said chain to idle the associated runner; each runner being moved along an idling portion by succeeding runners moved into the idling portion by said chain; and means operable, as each runner reaches the end of an idler portion, to re-engage the associated latch means with said chain to couple the runner to said chain for movement along said guide rail thereby; said guide rail is an elongated metal extrusion having formed therein an elongated slot receiving said chain and confining said chain both laterally and vertically of said guide rail; a guide rail cover which is an elongated metal extrusion arranged to be secured to said guide rail and defining, with said guide rail, a guiding channel for said runners; said guide rail having a depending portion extending therealong and forming a substantially vertically oriented guiding surface; each runner having a first guide engageable with a surface of said channel and a second guide engageable with said substantially vertical guiding surfaces.

2. A conveyor system, for receiving, transporting and discharging workpieces to be processed at processing stations, comprising, in combination, an elongated guide rail arranged to extend substantially horizontally past a series of workpiece processing stations; a driven chain extending in laterally confined relation along and guided in said guide rail; runners engaged with said guide rail for guided movement therealong past the processing stations; respective workpiece supports mounted on each runner; respective latch means on each runner operable to couple the associated runner to said chain and to uncouple the associated runner from said chain; said guide rail having idling portions extending therealong at certain of said processing stations; means operable, as each runner reaches an idling portion to disengage the associated latch means from said chain to idle the associated runner; each runner being moved along an idling portion by succeeding runners moved into the idling portion by said chain; means operable, as each runner reaches the end of an idler portion, to re-engage the associated latch means with said chain to couple the runner to said chain for movement along said guide rail thereby; each workpiece support being mounted on its associated runner for relative vertical displacement between a workpiece transport position and a workpiece processing station; means biasing each workpiece support to its workpiece transport position; means, at each processing station having a guide rail idling portion extending therealong, operable to progressively move each workpiece support, as the latter is moved along said guide rail by the associated runner, into its work processing position and then to release the workpiece support for relatively abrupt vertical return into its transport position at the entrance to the associated guide rail idling portion.

3. A conveyor system, for receiving, transporting and discharging workpieces to be processed at processing stations, comprising, in combination, an elongated guide rail arranged to extend substantially horizontally past a series of workpiece processing stations; a driven chain extending in laterally confined relation along and guided in said guide rail; runners engaged with said guide rail for guided movement therealong past the processing stations; respective workpiece supports mounted on each runner; respective latch means on each runner operable to couple the associated runner to said chain and to uncouple the associated runner from said chain; said guide rail having idling portions extending therealong at certain of said processing stations; means operable, as each runner reaches an idling portion to disengage the associated latch means from said chain to idle the associated runner; each runner being moved along an idling portion by succeeding runners moved into the idling portion by said chain; means operable, as each runner reaches the end of an idler portion, to re-engage the associated latch means with said chain to couple the runner to said chain for movement along said guide rail thereby; said chain being a roller chain; said latch means comprising respective sprockets rotatably mounted on each runner and engaged with said chain, and respective latches on each runner engaged with the associates sprocket to lock the same against rotation for movement of the associated runner by said chain along said guide roll; said means at the entrance to each idler portion of said guide roll releasing each latch as the associated runner enters the idler portion for free rotation of the associated sprocket by said chain, and said means at the end of each guide rail idler portion re-engaging each latch with the associated sprocket as the associated runner reaches the end of the idler portion; each latch comprising a pin on the associated runner mounted for pivoting about a horizontal axis between a latching position in which its upper end engages the associated sprocket and an uncoupling position in which its upper end is disengaged from the associated sprocket; said guide rail including a depending portion having a substantially vertical surface extending longitudinally of said guide rail in spaced parallel relation to said pins; and a cam rib projecting outwardly from said surface and engaged with the lower ends of said pins to maintain said pins with their upper ends engaged with the associated sprockets; said cam rib, at said idler portions, being recessed to provide clearance for movement of the lower ends of said pins toward said vertical surface to disengage the upper edge of said pins from the associated sprockets.

4. A conveyor system, as claimed in claim 3, in which the pivot axis of each pin is arranged very substantially near its lower end whereby, at such idler portions, the upper end of each pin will automatically swing out of engagement with the associated sprocket.

5. A conveyor system, for receiving, transporting and discharging workpieces to be processed at processing stations, comprising, in combination, an elongated guide rail arranged to extend substantially horizontally past a series of workpiece processing stations; a driven chain extending in laterally confined relation along and guided in said guide rail; runners engaged with said guide rail for guided movement therealong past the processing stations; respective workpiece supports mounted on each runner; respective latch means on each runner operable to couple the associated runner to said chain and to uncouple the associated runner from said chain, said guide rail having idling portions extending therealong at certain of said processing stations; means operable, as each runner reaches an idling portion to disengage the associated latch means from said chain to idle the associated runner; each runner being moved along an idling portion by succeeding runners moved into the idling portion by said chain; means operable, as each runner reaches the end of an idler portion, to re-engage the associated latch means with said chain to couple the runner to said chain for movement along said guide rail thereby; each latch means comprising a plate having a forked inner end engageable with said chain; each runner being formed with a guide rail for reciprocation of the associated forked plate laterally toward and away from said chain; and a bushing on each forked plate mounted for rotation about a substantially vertical axis; said means at the entrance to each idler portion and at the end of each idler portion comprising respective cams engageable with said bushings to retract the associated forked plate out of engagement with said chain at the entrance to each idler portion and to advance the associated plate into engagement with said chain at the end of each idler portion.

6. A conveyor system, for receiving, transporting and discharging workpieces to be processed at processing stations, comprising, in combination, an elongated guide rail arranged to extend substantially horizontally past a series of workpiece processing stations; a driven chain extending in laterally confined relation along and guided in said guide rail; runners engaged with said guide rail for guided movement therealong past the processing stations; respective workpiece supports mounted on each runner; respective latch means on each runner operable to couple the associated runner to said chain and to uncouple the associated runner from said chain; said guide rail having idling portions extending therealong at certain of said processing stations; means operable, as each runner reaches an idling portion to disengage the associated latch means from said chain to idle the associated runner; each runner being moved along an idling portion by succeeding runners moved into the idling portion by said chain; means operable, as each runner reaches the end of an idler portion, to reengage the associated latch means with said chain to couple the runner to said chain for movement along said guide rail thereby; said guide rail being an extruded metal member formed with a slot extending longitudinally thereof an receiving said chain, said slot having formations restricting said chain against lateral and vertical movement; a cover secured to said guide rail and defining, with said guide rail, a channel for guiding said runners; said guide rail having a depending portion with an outwardly facing substantially vertical surface extending parallel to said runners; each runner including a first slide engaged with a surface of said channel and a second slide engaged with said vertical surface; said workpiece supports being mounted on the associated runners for relative vertical displacement between a workpiece transport position and a workpiece processing position; means biasing each support to its workpiece transport position; a guide wheel rotatably mounted on each workpiece support for rotation about a substantially horizontal axis, and normally engaging the lower end of said guide rail extension; and respective cams secured to said extension of said guide rail on said substantially vertical surface at certain processing stations and having downwardly and forwardly sloping surfaces engageable with said guide wheels to progressively move the associated workpiece support, as it is moved along said guide rail by the associated runner, into its work processing position; said cams having vertically extending surfaces at their trailing ends to release the associated work supports for relatively abrupt vertical return into the transport position.

* * * * *